Dec. 8, 1970 D. ESPINAL 3,546,487

DRIVE CIRCUIT FOR DIGIT LINES

Filed April 15, 1966 2 Sheets-Sheet 1

INVENTOR.
DANIEL ESPINAL
BY
Carl V. Olson
Attorney

INVENTOR.
DANIEL ESPINAL
BY Carl V. Olson
Attorney 3,546,487
DRIVE CIRCUIT FOR DIGIT LINES Daniel Espinal, Franklin, Mass., assignor to RCA Corporation, a corporation of Delaware Filed Apr. 15, 1966, Ser. No. 542,801
Int. Cl. G11c *5/02, 7/00;* H03k *1/00*
U.S. Cl. 307—270 1 Claim

ABSTRACT OF THE DISCLOSURE

A digit driver circuit involving about 80% less power dissipation than prior art arrangements includes, in series, a first bias source, a first current switch, a memory digit line, and a second current switch. The first switch is closed to charge the line, the second switch is closed to permit a steeply-rising current through the line; then the first switch is opened and a continuing current through the line is supplied through a diode from a second lower-voltage source.

This invention relates to pulse circuits, and particularly to circuits for driving a current pulse of standardized amplitude through a line including inductance. While not limited thereto, the invention is particularly useful for driving a current pulse through a digit or inhibit line of a memory including an array of magnetic memory elements such as magnetic cores.

A magnetic memory customarily consists of an array of magnetic memory elements linked by selection lines (word lines or X–Y lines) and linked by information-inserting lines (digit lines or inhibit lines). A separate sense line may also be included, or the digit lines may be used also for sense signals. When information is written into the memory, the digit or inhibit lines are driven or not driven, in accordance with the information digits to be stored, by respective transistor digit drivers. It is desirable that each digit driver supply a current pulse through its respective digit line which has a steep leading edge and which has a standardized maximum amplitude. The steep leading edge of the digit driver output pulse is customarily provided by employing a relatively high bias potential source to overcome the inductive effect of the magnetic elements linked by the digit line. The standardized maximum amplitude of the digit driver output pulse is obtained by employing a relatively large resistor in series with the digit line.

It is a general object of this invention to provide an improved digit driver having improved efficiency and greatly reduced power dissipation.

According to an example of the invention, a digit driver includes a first potential source connected through a first transistor current switch to one end of the memory digit line to be driven. A second relatively low potential source is connected through a unidirectional conduction device or rectifier to the same one end of the digit line. The other end of the digit line is connected through a second transistor current switch to a return path of the potential sources. The first transistor is initially rendered conductive to charge the digit line to the potential of the first potential source. The second transistor is rendered conductive before the first transistor is turned off. During the time that both transistors are conductive, a steeply-rising current is made to flow through the digit line. After the first transistor is turned off and during the time that the second transistor remains on, a continuing standardized current flows from the second potential source, through the unidirectional current device, through the digit line and through the second transistor.

Figure 1:
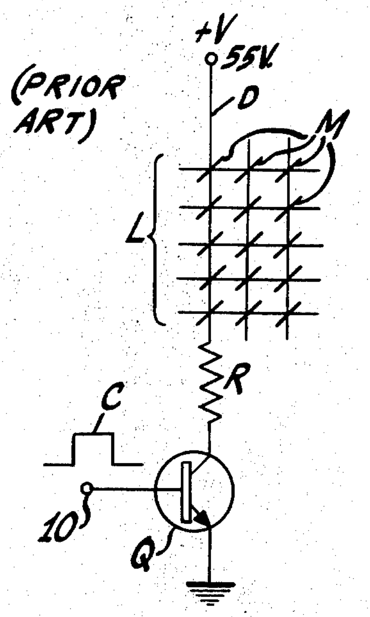
FIG. 1 is a circuit diagram of a prior art digit driver.

Referring now in greater detail to the drawing, FIG. 1 shows a prior art digit driver for one digit line D in a magnetic memory array of magnetic cores M. The magnetic cores linked by the digit line D present an inductance L which must be overcome in initiating a current through the digit line. The prior art digit driver includes a potential source terminal +V connected through the digit line D, through a resistor R, and through the current-path electrodes of a transistor switch Q to a return path of the potential source. The transistor Q is normally non-conductive, and is rendered fully conductive by a pulse C connected to the control electrode 10 of the transistor Q.

The prior art circuit of FIG. 1 requires a high potential +V source, having a value typically of 55 volts, in order to overcome the effect of inductance L and provide a steeply-rising current pulse through the digit line D. The prior art circuit also requires a resistor R, having a value typically of 130 ohms, for the purpose of limiting the amplitude of the current pulse flowing through the digit line D after a steeply-rising buildup of current has been established in the digit line D. The continuing current flowing through the resistor R results in the dissipation of power in the resistor in the form of heat. The amount of power dissipated in the resistor R is about four times as great as the power usefully dissipated in accomplishing the switching of magnetic cores M linked by the digit line D.

It is also known in the prior art to use a digit driver constructed to continuously supply a value of current which is normally steered into a dissipating current sink, and which is steered when needed through a digit line of a memory. Such a known current-steering arrangement is wasteful of current in that only a small proportion of the continuously generated current is usefully applied to the memory. The wasted current is expensive to generate, and its dissipation results in the generation of undesired heat which must be removed.

Figure 2:
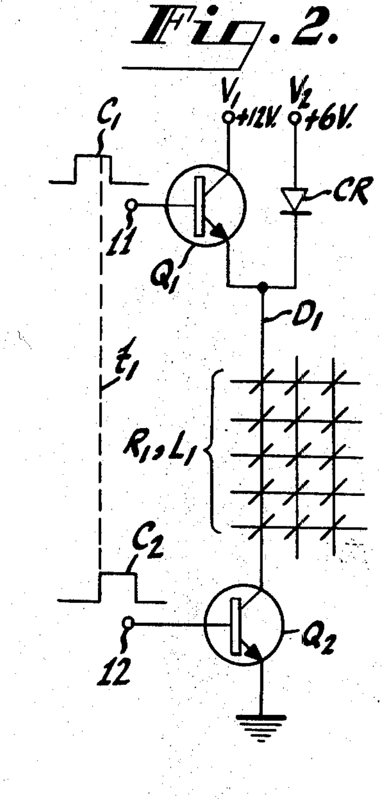
FIG. 2 is a circuit diagram of a digit driver constructed according to the teachings of this invention.

FIG. 2 shows a digit driver circuit according to the invention. A $V_1$ terminal of a first potential source is connected through the current-path electrodes of a first transistor current switch $Q_1$ to one end of the digit line D. The transistor $Q_1$ is normally nonconducting and is rendered fully conductive by the application to its control electrode 11 of a positive pulse $C_1$. A $V_2$ terminal of a second potential source is connected through a unidirectional current device or rectifier CR to the same end of the digit line $D_1$. The first source terminal $V_1$ may have a potential of +12 volts and the second potential terminal $V_2$ may have a potential of +6 volts.

The other, lower end of the digit line $D_1$ is connected through the current-path electrodes of a second transistor current switch $Q_2$ to a return path of the potential sources having terminals $V_1$ and $V_2$. The transistor $Q_2$ is normally nonconducting and is rendered fully conducting by the application to its control electrode 12 of a positive pulse $C_2$.

Figure 3:
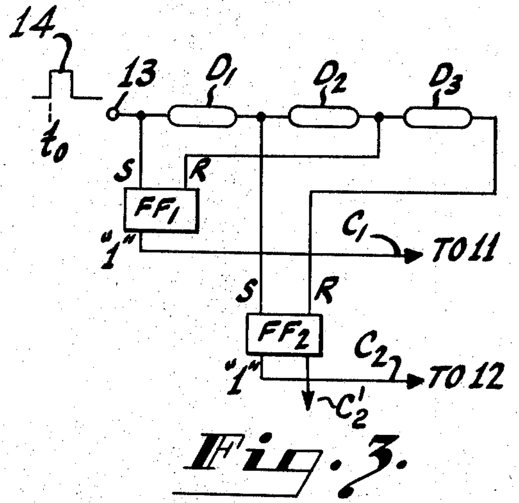
FIG. 3 is a block diagram of a system for generating two-time-overlapping pulses for application to the two transistor switches in the digit driver of FIG. 2.

FIG. 3 shows an exemplary arrangement for providing two time-overlapping pulses to respective transistors $Q_1$ and $Q_2$ in FIG. 2. The arrangement of FIG. 3 includes an input terminal 13 connected to three series-connected delay means $D_1$, $D_2$ and $D_3$. A first flip-flop $FF_1$ has a set input coupled to the input terminal 13, and has a reset input coupled to the output of delay means $D_2$. A second flip-flop $FF_2$ has a set input connected to the output of delay means $D_1$ and has a reset input coupled to the output of delay means $D_3$. The "1" output of flip-flop $FF_1$ provides an output for connection to terminal 11 in FIG. 2, and the "1" output of flip-flop $FF_2$ provides an output for connection to terminal 12 in FIG. 2.

Figure 4:
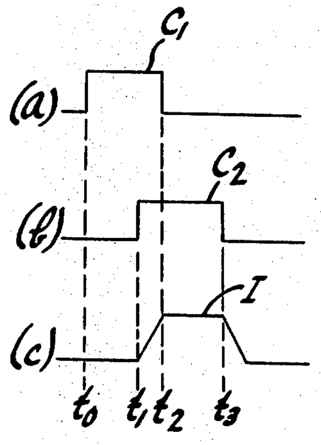
FIG. 4 is a chart of voltage and current relationships which will be referred to in describing the operation of the digit driver of FIG. 2.

FIG. 4*a* is a chart showing the voltage pulse $C_1$ applied to the control electrode 11 of transistor $Q_1$. FIG. 4*b* is a chart showing a time-overlapping voltage pulse $C_2$ applied to the control electrode 12 of transistor $Q_2$. FIG. 4*c* is a chart showing the resulting current I which flows through the digit line $D_1$ in FIG. 2.

In operation, the system of FIG. 3 responds at time $t_0$ to the leading edge of an input pulse 14 applied to input terminal 13 to set the flip-flop $FF_1$. At a later time $t_1$ determined by the delay device $D_1$, the flip-flop $FF_2$ is set.

At a still later time $t_2$ determined by the delay device $D_2$, the flip-flop $FF_1$ is reset to terminate its output pulse $C_1$. Finally at a time $t_3$ determined by the delay device $D_3$, the flip-flop $FF_2$ is reset to terminate its output pulse $C_2$. As shown in FIGS. 4*a* and 4*b*, the pulses $C_1$ and $C_2$ overlap in time, and pulse $C_2$ continues for a period following termination of pulse $C_1$.

The operation of the digit driver circuit of FIG. 2 will now be described. The leading edge of the pulse $C_1$ applied to the control terminal 11 of transistor $Q_1$ causes the transistor to be rendered fully conductive. This connects the potential of source $V_1$ to one end of the digit line $D_1$. Since the transistor $Q_2$ is still nonconducting, current cannot flow through the digit line $D_1$, but a charging current can and does flow into the digit line $D_1$, to raise its potential to the potential of source $V_1$.

While transistor $Q_1$ is turned on, at time $t_1$, transistor $Q_2$ is also turned on by pulse $C_2$ applied to its control terminal 12. Current then starts flowing through the digit line $D_1$ in a rapidly increasing manner determined by the value of the inductance $L_1$ presented by the magnetic cores linked with digit line $D_1$. The inductance $L_1$ may typically have a value of 25 micro-henries. The increasing current is given by the formula:

$$I=\frac{V_1}{R_1}\left(1-e\frac{R_1}{L_1}t\right)$$

where $R_1$ is the resistance in the series path from terminal $V_1$ to ground. The value of resistance $R_1$ is relatively low and is determined primarily by the resistance of the digit line $D_1$. The resistance of digit line $D_1$ may be accurately controlled by employing Nichrome wire trimmed to a length provided a desired standardized value of resistance.

Since the resistance $R_1$ of digit line $D_1$ is small compared with the resistance R in the prior art circuit of FIG. 1, the current in digit line $D_1$ in FIG. 2 builds up rapidly and if continued would asymptotically approach an undesirably-large current value equal to $V_1/R_1$. Advantage if taken of the steeply-rising current, and then, when a desired current amplitude is reached at time $t_2$, the transistor $Q_1$ is turned off by the trailing edge of the pulse $C_1$ applied to its control terminal. The desired value of current then continues to flow through the digit line $D_1$ from the second potential source $V_2$. The shutting off of the transistor $Q_1$ removes the back bias from the rectifier CR so that it becomes conductive in passing current from terminal $V_2$ through the digit line $D_1$ and through the second transistor $Q_2$ to ground. The lower voltage of the source $V_2$ is sufficient to maintain a continuing current flow through the digit line $D_1$ because the inductance $L_1$ does not affect or resist a constant or unchanging current flow. The relatively low voltage of the second potential source $V_2$ combined with the absence of appreciable resistance in circuit with the digit line $D_1$ results in the maintenance of the desired current without an undesired dissipation of energy in a resistor such as the resistor R in the prior art circuit of FIG. 1.

The described standardized value of current continues to flow from the time $t_2$ to the time $t_3$ at the trailing edge of the pulse $C_2$ applied to transistor $Q_2$. The current flow through the digit line $D_1$ is thus a current pulse as represented in FIG. 4*c*.

Figure 5:
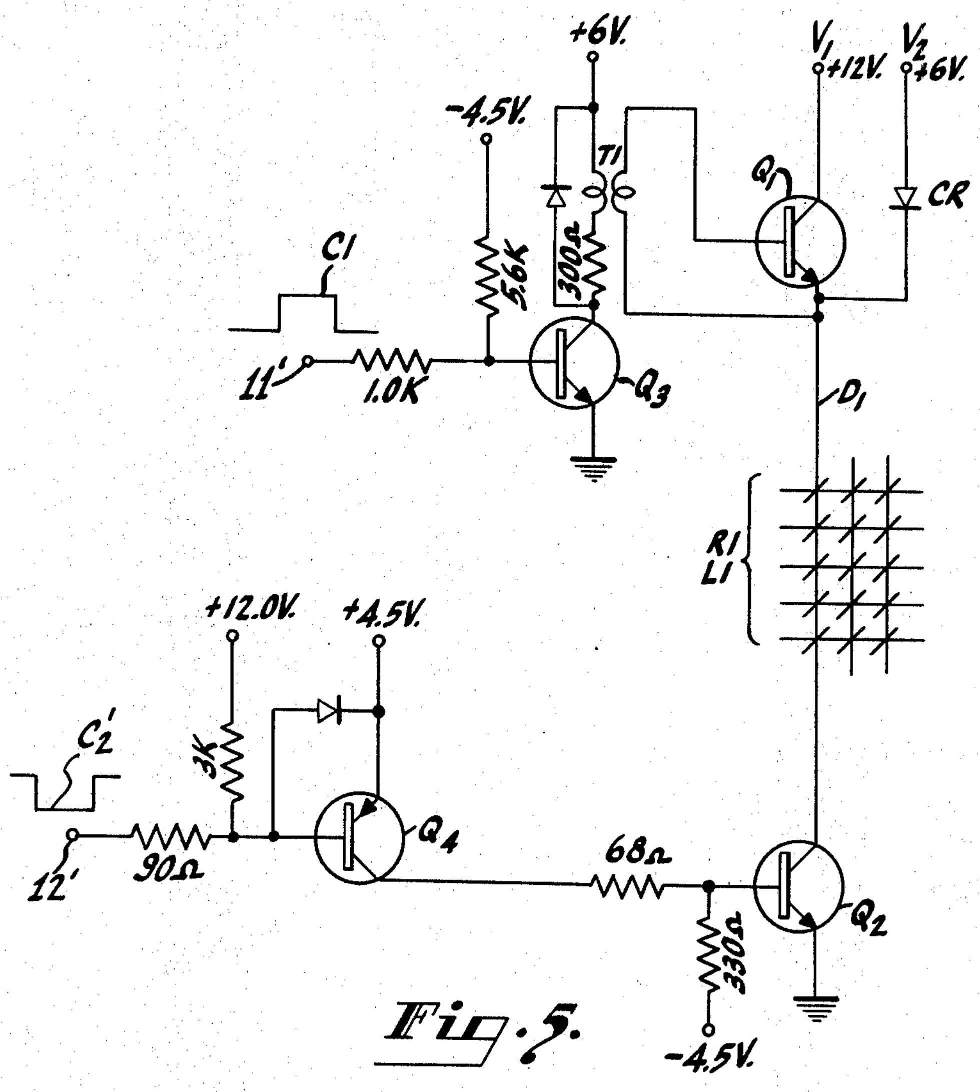
FIG. 5 is a circuit diagram like FIG. 2 but showing exemplary current switches in greater detail.

FIG. 5 is a digit driver circuit in which the current switches $Q_1$ and $Q_2$ of FIG. 2 are shown in greater detail. The upper current switch in FIG. 5 is a conventional current switch including transistors $Q_1$ and $Q_3$ which respond to an input pulse at terminal 11'. The lower current switch is a conventional switch including transistors $Q_2$ and $Q_4$ which respond to an input signal at terminal 12'.

The digit driver circuits of FIGS. 2 and 5 involve a power dissipation which is from seventy to ninety percent less than the power dissipation in a prior art circuit according to FIG. 1. About forty percent of the total power dissipation in a magnetic memory is due to power dissipation in the digit driver circuits. Therefore, the reduced power dissipation afforded by digit drivers according to the invention permit a very significant reduction in the overall power dissipation of a complete memory system.

What is claimed is:

1. A driver for a digit or inhibit line of a magnetic memory, comprising
   - a first potential source and a first transistor switch having a control electrode and having current-path electrodes coupling said first potential source to one end of said line,
   - a second lower potential source, and a unidirectional current device coupling the second potential source to said one end of said line,
   - a second transistor switch having a control electrode and having current-path electrodes coupling the other end of said line through a return path to said potential sources,
   - means to apply a first pulse to the control electrode of said first switch to connect said first potential source to said line to cause an initial charging of the line to the potential of the first potential source, and
   - means to apply a second pulse to the control electrode of said second switch, said second pulse starting at a time intermediate the beginning and end of the first pulse and ending at a time following the end of the first pulse, to cause an initial current flow through the line from the first potential source, and then to cause a continuing current flow in the same direction through the line from the second potential source.

References Cited

UNITED STATES PATENTS

| | | | |
|---|---|---|---|
| 3,360,786 | 12/1967 | Steele et al. | 340—174 |
| 3,025,411 | 3/1962 | Rumble | 307—270X |
| 3,143,668 | 8/1964 | Bloodworth et al. | 307—242 |
| 3,383,526 | 5/1968 | Berding | 307—270 |
| 3,380,038 | 4/1968 | Cohler | 340—174 |
| 3,351,924 | 11/1967 | Meyerhoff et al. | 340—174 |

JAMES W. MOFFITT, Primary Examiner

U.S. Cl. X.R.

307—253, 254; 340—174